(12) United States Patent
Benczur-Uermoessy et al.

(10) Patent No.: US 6,806,001 B1
(45) Date of Patent: Oct. 19, 2004

(54) BATTERY IN BIPOLAR STACKED CONFIGURATION AND METHOD FOR THE PRODUCTION THEREOF

(75) Inventors: Gabor Benczur-Uermoessy, Stuttgart (DE); Marita Gesierich, Weinstadt (DE); Detlef Ohms, Holzminden (DE); Klaus Wiesener, Dresden (DE)

(73) Assignee: Deutsche Automobilgesellschaft mbH, Braunschweig (DE)

( * ) Notice: Subject to any disclaimer, the term of this patent is extended or adjusted under 35 U.S.C. 154(b) by 0 days.

(21) Appl. No.: 10/019,483

(22) PCT Filed: May 6, 2000

(86) PCT No.: PCT/EP00/04085

§ 371 (c)(1),
(2), (4) Date: May 13, 2000

(87) PCT Pub. No.: WO01/03225

PCT Pub. Date: Jan. 11, 2001

(30) Foreign Application Priority Data

Jun. 29, 1999 (DE) .......................................... 199 29 950

(51) Int. Cl.$^7$ ............................................. H01M 10/34
(52) U.S. Cl. ......................... 429/210; 429/60; 429/159; 429/223; 29/623.1
(58) Field of Search ................................ 429/156, 159, 429/160, 210, 223, 60, 218.2; 29/623.1

(56) References Cited

U.S. PATENT DOCUMENTS

| | | | |
|---|---|---|---|
| 1,656,203 A | | 1/1928 | Kapitza |
| 3,959,018 A | * | 5/1976 | Dunlop et al. ................ 429/40 |
| 4,051,305 A | * | 9/1977 | Benczur-Urmossy et al. .......................... 429/217 |
| 4,215,184 A | * | 7/1980 | Gutmann et al. ........... 429/101 |
| 4,324,845 A | * | 4/1982 | Stockel ....................... 429/101 |
| 4,567,119 A | * | 1/1986 | Lim ............................. 429/59 |
| 4,748,096 A | | 5/1988 | Imhof |
| 4,755,441 A | | 7/1988 | Imhof et al. |
| 4,844,999 A | * | 7/1989 | Oshitani et al. ............ 429/223 |

(List continued on next page.)

FOREIGN PATENT DOCUMENTS

| | | |
|---|---|---|
| DE | 453977 | 12/1927 |
| DE | 876260 | 12/1950 |
| DE | 3632351 | 10/1987 |
| DE | 3632352 | 10/1987 |
| DE | 3822197 | 8/1989 |
| DE | 3935368 | 5/1991 |
| DE | 4004106 | 2/1992 |
| DE | 4104865 | 4/1992 |
| DE | 4040017 | 11/1992 |
| DE | 4103546 | 7/1993 |
| DE | 4225708 | 9/1993 |
| DE | 69216230 | 7/1997 |
| EP | 0125904 | 5/1984 |
| EP | 0863565 | 3/1998 |

OTHER PUBLICATIONS

Copy of German office action dated Jan. 18, 2000.
International Search Report.

*Primary Examiner*—Gregg Cantelmo
(74) *Attorney, Agent, or Firm*—Crowell & Moring LLP

(57) ABSTRACT

The invention relates to a battery of bipolar stack design, having a plurality of subcells. The battery, the subcells of which comprise in each case two electrodes of different polarity and an electrolyte-impregnated separator, are electronically connected via an electrically conductive connecting wall between them. All the subcells are connected to a common gas space. The connecting walls between the subcells produce the electrical contact and, at the same time, exclude any electrolytic connection. The electrolyte is fixed in a limited quantity in the electrodes and the separator. The subcells are pressed together by a continuously acting force. The current is discharged on the outer walls of the casing, which are designed as pressure plates.

27 Claims, 1 Drawing Sheet

U.S. PATENT DOCUMENTS

| | | | |
|---|---|---|---|
| 4,888,256 A | * 12/1989 | Zuckerbrod | 429/144 |
| 4,977,043 A | * 12/1990 | Kadouchi et al. | 429/54 |
| 5,032,475 A | * 7/1991 | Hasebe et al. | 429/60 |
| 5,085,254 A | 2/1992 | Imhof | |
| 5,085,956 A | 2/1992 | Imhof et al. | |
| 5,156,899 A | 10/1992 | Kistrup et al. | |
| 5,238,028 A | 8/1993 | Imhof et al. | |
| 5,246,797 A | 9/1993 | Imhof et al. | |
| 5,395,710 A | 3/1995 | Imhof et al. | |
| 5,419,981 A | 5/1995 | Golben | |
| 5,552,243 A | 9/1996 | Klein | |
| 5,585,142 A | * 12/1996 | Klein | 427/216 |
| 5,618,641 A | * 4/1997 | Arias | 429/210 |
| 6,146,786 A | * 11/2000 | Stadnick et al. | 429/101 |

* cited by examiner

BATTERY IN BIPOLAR STACKED CONFIGURATION AND METHOD FOR THE PRODUCTION THEREOF

BACKGROUND AND SUMMARY OF THE INVENTION

The invention relates to a battery for the electrochemical storage of energy in bipolar stack design, and to a method for its production. The invention relates in particular to the structure and method of operation of an electrochemical battery of this type.

Alkaline storage batteries with a type of electrode which has become known as a fibrous-structure framework electrode have been in existence for about 15 years. Electrodes of this type and methods for their production are described, for example, in DE 40 40 017 C2, DE 41 03 546 C2, DE 38 22 197 C1, DE 40 04 106 C2, DE 39 35 368 C1, DE 36 32 351 C1, DE 36 32 352 C1, DE 41 04 865 C1 and DE 42 25 708 C1.

For example, DE 40 04 106 C2 discloses a fibrous structure framework electrode with a high load-bearing capacity, DE 38 22 197 C1, DE 40 40 017 C2 and DE 41 03 546 C2 disclose methods for filling fibrous structure framework electrodes for storage batteries with an active-compound paste.

Conventional storage batteries comprise individual galvanic elements which are composed of individual electrodes of different polarity, the electrolyte, the separator between the electrodes, the cell or battery casing and the current-carrying and other passive components.

A bipolar stack design differs from the conventional structure in that the connectors between the individual cells and the separate cell casings are dispensed with, and the electrochemical elements, which are referred to as subcells, are connected in series by conductive partitions.

Each subcell has a positive electrode, a separator and a negative electrode, the two electrodes being separated by the electrolyte-filled separator.

Between each pair of subcells there is a connecting wall which is responsible both for electrolytic separation of the subcells and for electrical conduction or contact perpendicular to the surface between the positive and negative electrodes, the current flowing transversely with respect to the electrodes.

For this purpose, the mutually facing surfaces of the connecting wall and the corresponding positive or negative electrode touch one another as a result of the connecting wall making contact with the electrodes over a large area under a pressure which is predetermined but changes slightly in operation. Consequently, there are short paths for the electric current. A structure of this type increases the specific energy, since the high consumption of material for the current discharge is minimized. This is because the inactive components, such as at least the current discharge lugs for each individual electrode and the pole bridges to which the current discharge lugs are attached, which are otherwise required to conduct electric current, are eliminated.

The diagrammatic bipolar structure and the method of operation of a multicell battery in pile form is described, for example, in the Batterie Lexikon by Hans-Dieter Jaksch, Pflaum-Verlag, Munich, p. 442. By way of example, metal or an electrically conductive polymer is known for the connecting wall. When using metallic connecting walls, nickel plates or nickel-coated steel plates are recommended for alkaline aqueous systems.

Therefore, it is an object of the present invention to provide a battery of bipolar stack design, in which, in operation, uniform loading of the individual subcells is possible. Furthermore, it is intended to provide a method for producing a battery of this type.

According to the invention, a battery includes pairs of positive and negative electrodes, separator layers and connecting walls. The components of the battery are in the form of plates and disks, and electrical contacts are provided only by pressing the individual plates or discs onto one another. The negative electrodes are only coated with the active material from one side, and the positive electrodes, on the contact side, are being substantially free of active compound. All the subcells have a common gas space but no electrolyte contact.

Therefore, the battery does not have the bipolar electrodes which are known from the literature, but rather comprises individual electrodes as discs or plates which are stacked with separator layers and thin disc-like connecting walls. The electrical contact is formed only as a result of the pressure exerted on the parts. It is expedient to ensure that metallic parts without insulating layers come into contact with one another and the connecting wall is clean. Furthermore, electrical contact can be improved by additions which increase the conductivity.

In particular, the battery according to the invention has a gas space which is common to all the electrodes or cells. The gas connection between the subcells produces, in accordance with the invention, a battery whose individual components are subject to uniform mechanical and electrical loads. Consequently, all the subcells are under the same gas pressure and the same surface pressure. Furthermore, it is possible to compensate for the hydrogen loading and the electrolyte concentration along the individual electrodes. The heat tone of the reactions at the electrodes also effects temperature compensation. In the same sense, the dilution of the electrolytes of the individual subcells is also compensated as a result of the transfer of water in gaseous form. A further advantage is that only a single pressure-relief/safety valve is required, because of the common gas space.

These features according to the invention are of considerable advantage in particular in the electrochemical nickel/metal hydride system which is preferably used for the operation of the cells, since the negative electrode is in gas equilibrium with the stored reactant hydrogen in the cell and the positive electrode tends to form gas at the charge end. The advantageous balancing of the charges which has been described is limited exclusively to the nickel/metal hydride system on which the invention is based.

It is also possible to optimize the design by using a suitable configuration of the connecting cross sections of the gas leadthroughs.

Advantageous refinements will emerge from the subclaims. The connecting elements may comprise nickel plates. Their thickness is advantageously at most 0.1 mm.

The compressive force to be applied is approximately 10 to 35 $N/cm^2$. It can be set by means of elastic elements, for example spring elements. However, it can also be set by means of a rigid construction of the battery according to the invention, in which case end plates which are at a fixed distance from one another are provided.

The ability of the lye to creep along metallic surfaces in the potential field transports and irreversibly shifts the electrolyte between the cells. This would lead to the battery system failing as a result of drying out. Surprisingly, it has emerged that, by applying a hydrophobic coating, which may comprise one or more partial layers, to the edges of the metallic connecting discs, this process is effectively prevented. According to the invention, it is preferable to carry out coating by means of polytetrafluoroethylene or a bituminous substance.

During the first charging of the battery according to the invention, the positive electrode expands as a result of water and alkali being incorporated in the substrate, for example in the layer grid of the nickel hydroxide in the fibrous structure electrode framework. The negative electrode also expands as a result of hydrogen being incorporated in the substrate material. Therefore, it is advantageous if the separators comprise an elastic nonwoven or felt which absorb compressive forces produced during the expansion of the electrodes.

A preferred design of the battery according to the invention uses a central passage, around which the stacks of electrodes, separators, and connecting walls are arranged. The stacks preferably are connected to the central passage by porous connecting elements. The subcells are in communication with the central passage through the porous connecting element, for example rings or the like made from porous polytetrafluoroethylene. A tie rod for relieving the load on the end plates may be provided in the central passage. The quantity of electrolyte can be regulated by adding liquid, such as water by means of a tube of porous material, e.g. porous polytetrafluoroethylene, which is fitted in the central passage.

In another preferred embodiment of the present invention, a side of each positive electrode facing one of the walls is free of insulating covering layers and/or has an addition which increases the conductivity.

In a preferred embodiment of the invention, a Ni/metal hydride battery of bipolar stack design includes a plurality of subcells, an electrically conductive wall, and a common gas space two pressure plates. The subcells are disposed in a gastight casing and pressed against each other, wherein each subcell includes positive and negative electrodes, a separator disposed between the positive and negative electrodes, and electrolyte in an amount determined by porosity of the electrodes and separator. The electrically conductive wall is positioned between two adjacent subcells, separates the electrolytes of the two adjacent subcells, and electrically connects the electrodes of the two adjacent subcells to one another. The two pressure plates function as current-discharge poles between which the subcells are disposed. The subcells are permanently pressed against one another in an elastic manner. The subcells form a stack, and the gas space is at the center of the stack. Each of the negative electrodes preferably has a higher capacitance than the corresponding positive electrode. Furthermore, the excess of negative capacitance of the negative electrodes is 50 to 150% of the capacitance of the corresponding positive electrode.

In another preferred embodiment of the invention, a Ni/metal hydride battery of bipolar stack design includes a plurality of subcells, an electrically conductive wall, and a common gas space two pressure plates. The subcells are disposed in a gastight casing and pressed against each other, wherein each subcell includes positive and negative electrodes, a separator disposed between the positive and negative electrodes, and electrolyte in an amount determined by porosity of the electrodes and separator. The electrically conductive wall is positioned between two adjacent subcells, separates the electrolytes of the two adjacent subcells, and electrically connects the electrodes of the two adjacent subcells to one another. The two pressure plates function as current-discharge poles between which the subcells are disposed. The subcells are permanently pressed against one another in an elastic manner. The subcells form a stack, and the gas space is at the center of the stack. Each negative electrode includes a metallic substrate material, wherein the substrate material has a woven fabric and/or an expanded metal and/or a three-dimensional metal structure, and wherein a plastic-bonded compound comprising a hydrogen storage alloy is introduced into the substrate material.

In further preferred embodiment of the invention, a Ni/metal hydride battery of bipolar stack design includes a plurality of subcells, an electrically conductive wall, and a common gas space two pressure plates. The subcells are disposed in a gastight casing and pressed against each other, wherein each subcell includes positive and negative electrodes, a separator disposed between the positive and negative electrodes, and electrolyte in an amount determined by porosity of the electrodes and separator. The electrically conductive wall is positioned between two adjacent subcells, separates the electrolytes of the two adjacent subcells, and electrically connects the electrodes of the two adjacent subcells to one another. The two pressure plates function as current-discharge poles between which the subcells are disposed. The subcells are permanently pressed against one another in an elastic manner. The subcells form a stack, and the gas space is at the center of the stack. Each wall has a rubber coating on its edges to prevent the electrolyte from leaking through.

In still further preferred embodiment of the invention, a Ni/metal hydride battery of bipolar stack design includes a plurality of subcells, an electrically conductive wall, and a common gas space two pressure plates. The subcells are disposed in a gastight casing and pressed against each other, wherein each subcell includes positive and negative electrodes, a separator disposed between the positive and negative electrodes, and electrolyte in an amount determined by porosity of the electrodes and separator. The electrically conductive wall is positioned between two adjacent subcells, separates the electrolytes of the two adjacent subcells, and electrically connects the electrodes of the two adjacent subcells to one another. The two pressure plates function as current-discharge poles between which the subcells are disposed. The subcells are permanently pressed against one another in an elastic manner. The subcells form a stack, and the gas space is at the center of the stack. The subcells have a porous felt body, and wherein the felt bodies act as a store for excess electrolyte.

In accordance with another aspect of the invention, a method for producing a battery includes the steps of disposing a plurality of subcells in a gastight casing and pressing the subcells against each other, wherein each subcell has positive and negative electrodes and a separator disposed between the electrodes, impregnating each separator with a predetermined amount of electrolyte, disposing an electrically conductive wall between two adjacent subcells to separate the electrolytes of the two adjacent subcells and to provide an electrical connection between the electrodes of the two adjacent subcells, placing a common gas space in the center of the subcells, disposing the subcells between two pressure plates functioning as current-discharge poles, and filling the subcells with electrolyte before the subcells are assembled.

In accordance with a further aspect of the invention, a method for producing a battery includes disposing a plurality of subcells in a gastight casing and pressing the subcells against each other, wherein each subcell has positive and negative electrodes and a separator disposed between the electrodes, impregnating each separator with a predetermined amount of electrolyte, disposing an electrically conductive wall between two adjacent subcells to separate the electrolytes of the two adjacent subcells and to provide an electrical connection between the electrodes of the two adjacent subcells, placing a common gas space in the center of the subcells, disposing the subcells between two pressure plates functioning as current-discharge poles, evacuating the battery and filling the battery by flushing with hydrogen without pressure.

The method according to the invention for assembling a battery according to the invention provides for the individual plates to be filled with electrolyte prior to assembly and for the components then to be stacked on top of one another.

The advantages achieved with the invention reside in particular in the fact that it is possible to produce a battery which allows high loads in terms of current combined with a favourable voltage on account of the short current path. The exchange operations in the battery, as well as the electrochemical system, ensure a high use time of the battery.

The method according to the invention is distinguished by the fact that the load-bearing capacity and handling of the battery is considerably improved compared to conventional batteries.

Advantageous refinements will emerge from the subclaims.

Exemplary embodiments of the present invention are described in more detail below with reference to the drawings.

DETAILED DESCRIPTION OF THE DRAWINGS

Figure 1:
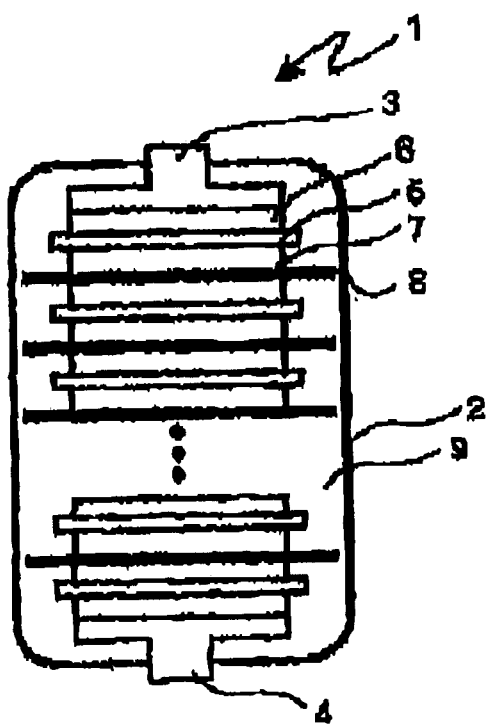
FIG. 1 diagrammatically depicts the design principle of a storage battery of bipolar stack design.

The storage battery 1 of stack design, which is diagrammatically depicted in FIG. 1, has a housing 2 with a negative pole 3 and a positive pole 4. In the housing 2 there is a stack of individual disc-like or plate-like separators 5, negative electrodes 6, positive electrodes 7 and connecting walls 8. All the discs 5, 6, 7, 8 or subcells formed therefrom have a common gas space 9. The stack is pressed together by spring elements (not shown), for example elastic discs, arranged on the inner wall of the housing 16. Electrical contact is produced only by the pressure. The connecting walls 8 may comprise nickel plates. Their thickness is advantageously at most 0.1 mm.

Figure 2:
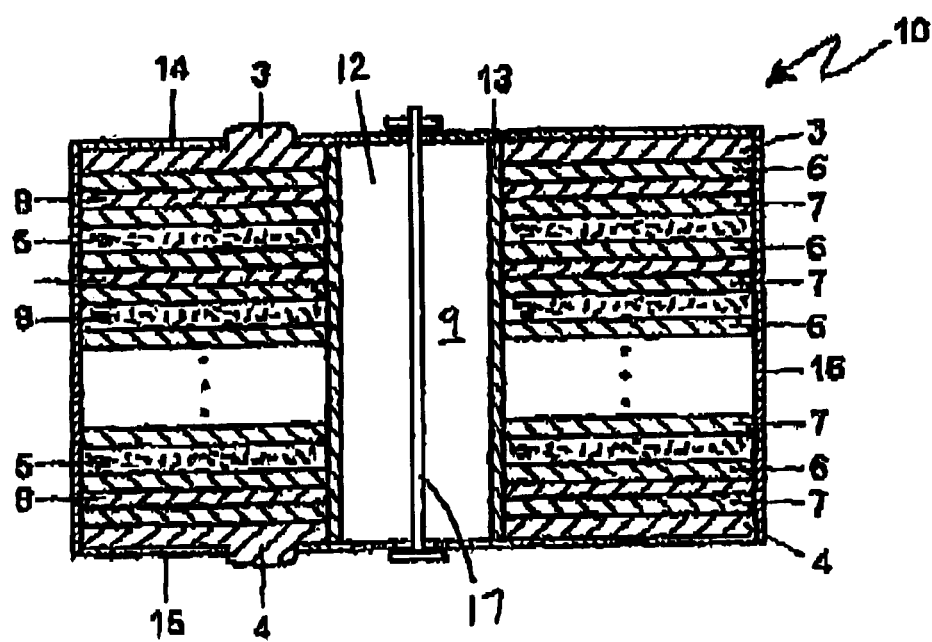
FIG. 2 shows a diagrammatic sectional illustration of the storage battery from FIG. 1 in the form of a round stack.

FIG. 2 diagrammatically depicts a longitudinal section through another embodiment 10 of the battery according to the invention. The disc-like or plate-like separators 5, electrodes 6, 7 and connecting walls 8 are now round and have a central passage which is designed as a central bore in the plates or discs 5, 6, 7, 8 and is closed off, for example, using a screw. A tie rod 17 may be provided in the central passage 12. The stack is enclosed fixedly in a housing 16, two end plates 14, 15 being provided, which are at a fixed distance from one another and provide the pressure. The end plates 14, 15 may be part of the housing 16 or may also be separate and surrounded by the wall of the housing 16. The stack is centred by means of O-rings which are arranged along the wall of the housing 16 and between in each case two connecting walls 8. They may be made from a porous material or of a material which promotes heat transfer between the plates or discs, for example neoprene. The common gas space 9 is formed by the central passage 12. It is advantageously also possible, for example, to top up electrolyte liquid via the central passage 12. The central passage 12 is designed in particular as a porous tube 13 made from polytetrafluoroethylene. As an alternative to the tube 13, it is also possible to use rings of porous material. The poles 3, 4 are situated on the top side and under side, respectively, of the housing 16. The pole plate provided may, for example, be a combination of nickel and honeycomb bodies made from plastic or aluminium with a high flexural strength.

In this design variant with fixed distance between the end plates, the pressure required to make contact is predetermined during construction and rises during the initial loading as a result of the expansion of the electrodes 6, 7. Since the electrodes are in practice not compressible, the separator 5, which preferably is made from an elastic material, acts as the spring.

Naturally, this battery construction is also possible with other geometric cross-sectional shapes, e.g. round, square, rectangular, etc.

All the exemplary embodiments do not in any way restrict the subject matter of the invention.

What is claimed is:

1. A Ni/metal hydride battery of bipolar stack design, comprising:
    a plurality of subcells disposed in a gastight casing and pressed against each other, each subcell including:
        positive and negative electrodes,
        a separator disposed between the positive and negative electrodes, and
        electrolyte fixed in an amount in the electrodes and separator;
    an electrically conductive wall positioned between two adjacent subcells, the wall separating the electrolytes of the two adjacent subcells and electrically connecting the electrodes of the two adjacent subcells to one another;
    a common gas space in communication with the subcells; and
    two pressure plates functioning as current-discharge poles between which the subcells are disposed, wherein the subcells are permanently pressed against one another in an elastic manner, wherein the subcells form a stack, and the gas space is at the center of the stack.

2. The battery according to claim 1, wherein each positive electrode includes a fibrous-structure electrode which is filled with nickel hydroxide active compound.

3. The battery according to claim 1, wherein a side of each positive electrode facing one of the walls is free of insulating covering layers and/or has an addition which increases the conductivity.

4. The battery according to claim 1, wherein each of the negative electrodes has a higher capacitance than the corresponding positive electrode.

5. The battery according to claim 4, wherein the excess of negative capacitance of the negative electrodes is 50 to 150% of the capacitance of the corresponding positive electrode.

6. The battery according to claim 1, wherein each negative electrode includes a metallic substrate material, wherein the substrate material has a woven fabric and/or an expanded metal and/or a three-dimensional metal structure, and wherein a plastic-bonded compound comprising a hydrogen storage alloy is introduced into the substrate material.

7. The battery according to claim 6, wherein the compound faces the separator.

8. The battery according to claim 1, wherein the negative electrodes are pasted asymmetrically.

9. The battery according to claim 1, wherein each negative electrode has a structure which allows gases to pass through it.

10. The battery according to claim 1 further comprising a tie rod disposed in the gas space, the tie rod being used to apply pressure to the stack of subcells.

11. The battery according to claim 1, wherein at least one sealing ring is disposed between each subcell and the common gas space, the at least one sealing ring preventing the passage of electrolyte and allowing the passage of gas.

12. The battery according to claim 11, wherein the at least one sealing ring includes porous polytetrafluoroethylene.

13. The battery according to claim 1, wherein each wall has a hydrophobic coating material on its edges to prevent the electrolyte from leaking through.

14. The battery according to claim 1, wherein each wall has a rubber coating on its edges to prevent the electrolyte from leaking through.

15. The battery according to claim 1, wherein the subcells have a porous felt body, and wherein the felt bodies act as a store for excess electrolyte.

16. The battery according to claim 1, wherein the negative electrode being coated with an active compound on only one side and/or the positive electrode, on a contact side, being free of active compound, electrical contact being effected only by the electrodes, the separators and the walls being pressed onto one another.

17. The battery according to claim 1, wherein the pressure between the components of the individual subcells and the subcells is approximately 10 to 35 N/cm$^2$.

18. The battery according to claim 1 further comprising an elastic element provided as a pressure-exerting component for pressing the subcells together.

19. The battery according to claim 1, further comprising two end plates, which are at a fixed distance from one another and exert a pressing force against the subcells.

20. The battery according to claim 1, wherein the walls are metallic, and boundary surfaces and/or edges of each wall have a hydrophobic coating that includes one or more bituminous substances of good adhesion.

21. A Ni/metal hydride battery of bipolar stack design, comprising:
a plurality of subcells disposed in a gastight casing and pressed against each other, each subcell including:
positive and negative electrodes,
a separator disposed between the positive and negative electrodes, and
electrolyte fixed in an amount in the electrodes and separator;
an electrically conductive wall positioned between two adjacent subcells, the wall separating the electrolytes of the two adjacent subcells and electrically connecting the electrodes of the two adjacent subcells to one another;
a common gas space; and
two pressure plates functioning as current-discharge poles between which the subcells are disposed, wherein the subcells are permanently pressed against one another in an elastic manner, wherein the subcells form a stack having a central passage, and wherein the individual subcells are connected to the central passage by porous connecting elements.

22. The battery according to claim 21, wherein the central passage has a porous tube.

23. The battery according to claim 21, wherein a porous connecting element and/or a porous tube include porous polytetrafluoroethylene.

24. The battery according to claim 21, wherein the central passage has a tie rod for relieving load on end plates.

25. A method for producing a battery, comprising:
disposing a plurality of subcells in a gastight casing and pressing the subcells against each other, wherein each subcell has positive and negative electrodes and a separator disposed between the electrodes;
impregnating each separator with a predetermined amount of electrolyte;
disposing an electrically conductive wall between two adjacent subcells to separate the electrolytes of the two adjacent subcells and to provide an electrical connection between the electrodes of the two adjacent subcells;
placing a common gas space in the center of the subcells so that the common gas space is in communication with the subcells;
disposing the subcells between two pressure plates functioning as current-discharge poles; and
filling the subcells with electrolyte before the subcells are assembled.

26. A method for producing a battery, comprising:
disposing a plurality of subcells in a gastight casing and pressing the subcells against each other, wherein each subcell has positive and negative electrodes and a separator disposed between the electrodes;
impregnating each separator with a predetermined amount of electrolyte;
disposing an electrically conductive wall between two adjacent subcells to separate the electrolytes of the two adjacent subcells and to provide an electrical connection between the electrodes of the two adjacent subcells;
placing a common gas space in the center of the subcells so that the common gas space is in communication with the subcells;
disposing the subcells between two pressure plates functioning as current-discharge poles;
making each of the positive and negative electrodes, separators and walls in the shape of a plate; and
placing the plates in a stack and pressing the plates together permanently during assembly.

27. A method for producing a battery, comprising:
disposing a plurality of subcells in a gastight casing and pressing the subcells against each other, wherein each subcell has positive and negative electrodes and a separator disposed between the electrodes;
impregnating each separator with a predetermined amount of electrolyte;
disposing an electrically conductive wall between two adjacent subcells to separate the electrolytes of the two adjacent subcells and to provide an electrical connection between the electrodes of the two adjacent subcells;
placing a common gas space in the center of the subcells so that the common gas space is in communication with the subcells;
disposing the subcells between two pressure plates functioning as current-discharge poles; and
evacuating the battery and filling the battery by flushing with hydrogen without pressure.

* * * * *